Feb. 21, 1933. J. MUIR 1,898,593
SHOCK SHIFTER HUB
Original Filed Nov. 11, 1927   2 Sheets-Sheet 1
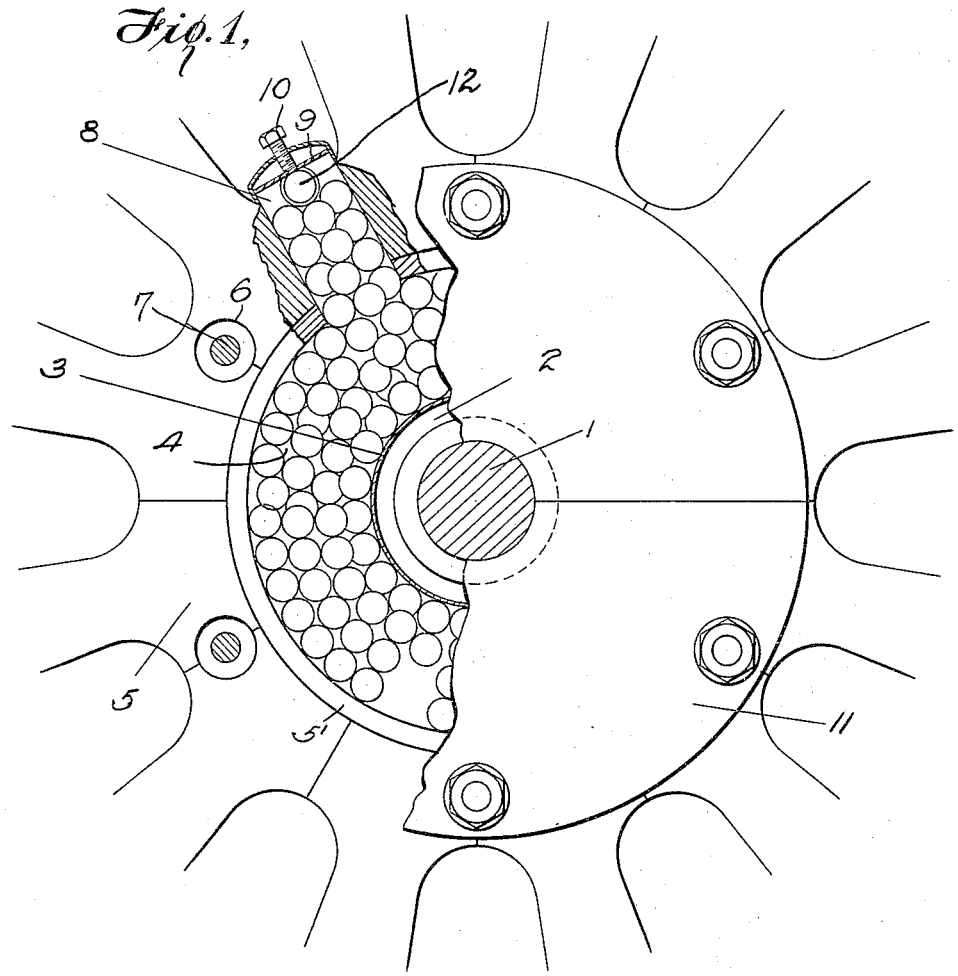
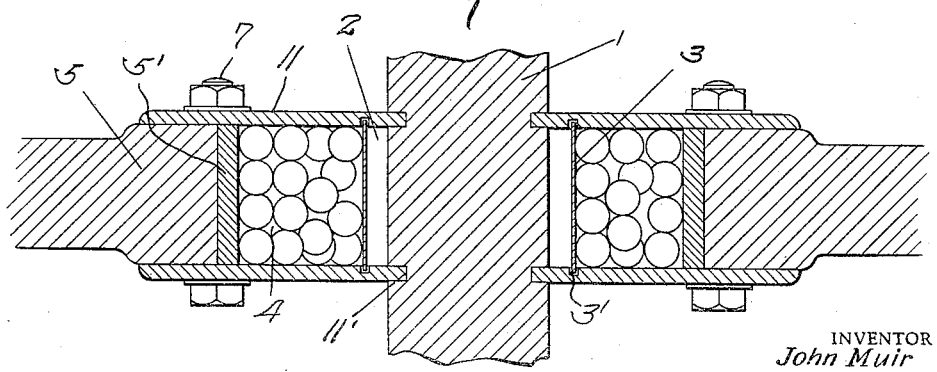
INVENTOR
John Muir
BY Townsend+Decker
ATTORNEYS

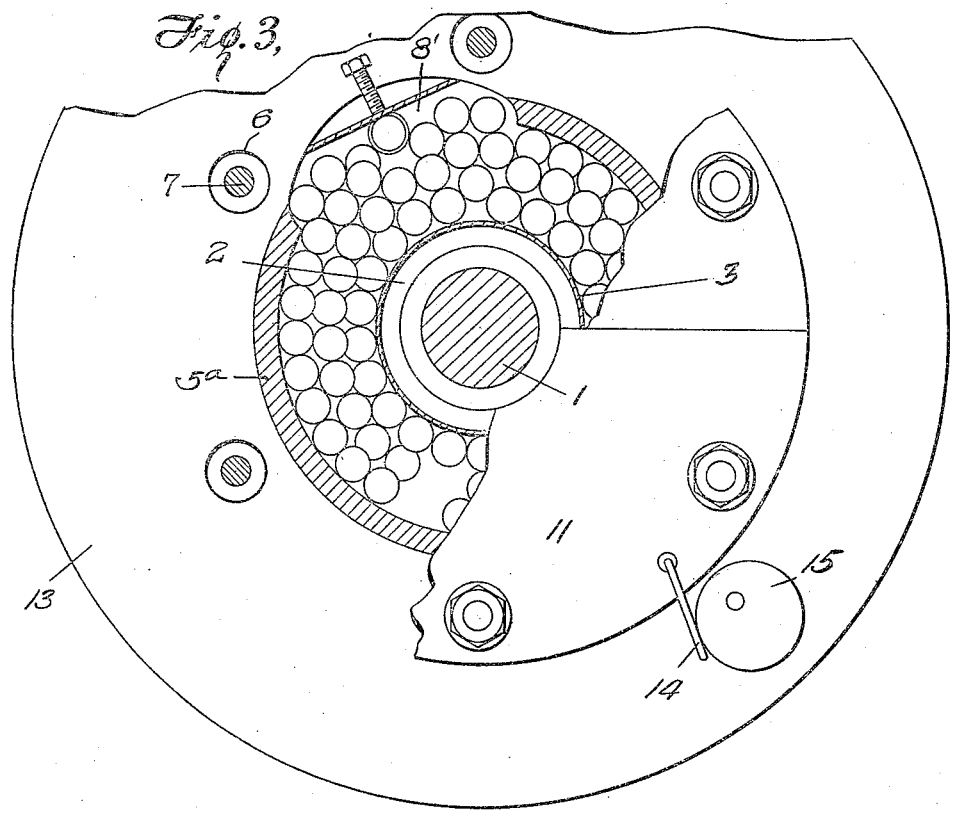

Patented Feb. 21, 1933

1,898,593

UNITED STATES PATENT OFFICE

JOHN MUIR, OF BEITH, SCOTLAND

SHOCK SHIFTER HUB

Application filed November 11, 1927, Serial No. 232,556, and in Great Britain November 11, 1926.
Renewed July 20, 1932.

A wheel for thus dealing with the momentum of violent and intermittent road shock through the action of suitably placed balls in an annular chamber around the axles in wheels specially constructed for the purpose has been described in the specification of my earlier Patent No. 889,951, patented June 9, 1908.

The more steadily destructive effects on roads and vehicles arise nevertheless from the cumulative effects of incessant minor vibratory shocks, which are without sufficient momentum to function as described in title hereof.

Therefore, I provide around the axle a vacant space so that the wheel with the thus attained additional flexibility rotates over the minor irregularities of the road and effectually minimizes these constant tremulous reactionary vibrations.

The construction of and around this vacant space is varied to suit the type of vehicles or wheels.

In general wheel construction for example, a tubular liner may be provided around this vacant space. This tubular liner then functions similarly to the balls in the ball-chamber. If given freedom of rolling contact on its support, than this tubular liner synchronizes as a rotary unit with the balls in their rotary motion.

I also provide a construction in which the rotary movement of the bolts synchronizes with that within the vacant space around the axle in those improved wheels in order that there be no rigidity of motion or resistance as the result of this "give and take" movement.

When upward violent road shocks take place, the space between the balls is thereby temporarily contracted and by the downward movement, it is constantly expanded at the apex of the ball chamber.

It is only when balls are inadequately packed that any damaging impact to the housing, to the bolts, or otherwise result. Therefore, to automatically avoid such, I provide methods of regulating the ball contents and the pressure on these in the ball chamber.

This may be accomplished by attaching to the central ball-chamber, one or more small recesses, preferably curvilinear recesses or appendices or several such, with sides converging to, or on to the expanded space at the apex of the ball-chamber, as hereinbefore described. The centrifugal force of the balls in the central ball-chamber, keeps such recess or recesses filled, so that when the rotating wheel presents any vacant space to their orifice or orifices, it is thus automatically filled with balls. These recesses are fitted with an inlet, so that at will the requisite number of balls therein is supplied to adjust to varying conditions. This inlet is also useful for supplying any required lubricant. With a suitably placed plug therein, balls can be further constrained in the direction indicated above.

When a ball-chamber is not so constructed and if quite frequent stoppings take place with an inadequately packed ball-chamber a tendency may arise for the axle to become slightly decentralized and thereby cause some irregularity in smoothly restarting. This eventuality can be provided against even if not preferably to the hereinbefore described methods by a short radial rod from a unit (usually a side plate) containing the wheel driving an eccentric disc, pivoted on the wheel itself to thereby cause a preliminary shock on the unstable equilibrium of the balls, whereby they flow under and support the axle, while engagement of the bolts is taking place. As this disc automatically adjusts itself to the movement of the wheel it is ever ready to come into action or by turning its pivoted eccentric and fixing it so as to rest on this radial rod, it remains inert.

The accompanying drawings illustrate the application of my present invention to a wheel.

Fig. 1 is a partial sectional elevation of a wheel.

Fig. 2 is a section at right angles to Fig. 1.

Fig. 3 is a view corresponding to Fig. 1 of a modification.

Referring to the first form of the invention:

1 is the axle.

2 is the vacant space around the axle.

3 is the cylindrical liner forming the inner wall of the ball chamber loosely mounted in grooves as indicated at 3'.

4 is the ball chamber containing the balls.

5 is the body of the wheel.

6 are holes in the body of the wheel.

7 are bolts of smaller diameter than the holes through which they pass and which connect the side plates to each other.

8 is an appendix.

9 is a plug in the appendix adjustably mounted as by means of the set screw 10. The plug 9 is movable to or from position to obstruct the opening 12 through which lubricant and the balls for the ball chamber may be introduced and withdrawn.

11 are the two side plates of the wheel suitably supported on the axle as indicated at 11'.

I provide two side plates 11 one of which is affixed to each side of the wheel body 5. These side plates are connected with each other by bolts 7 passing through holes 6 in the wheel body and fastened with a nut or other suitable means. These bolts are shouldered or have a sleeve of suitable length so that the side plates are held adjacent to either side of but not gripping the wheel body.

A cylindrical liner 3 extends from one side plate to the other, each end fitting loosely into a circular slot 3' of larger diameter cut into each side plate, the circular slot being concentric with the axle.

Thus the axle and bolts are held by the side plates in fixed relation to each other, their common center being the axis of the axle. For convenience in description I will term these assembled parts the axial structure.

My wheel may therefore be said to be constructed mainly of two parts, the axial structure and the wheel body. The rotary motion of the axle structure imparts rotary motion in the same direction to the wheel body.

Into the ball chamber 4 I insert balls, sufficiently packing this space between the cylindrical liner 3 and the wheel body 5, or preferably the case hardened circular member 5' forming the inner surface of the wheel body. When properly packed there is an absence of diametrical pressure on the liner by the balls. It must be noted that the capacity of the ball chamber is constant but that its precise shape is, within limits, variable—that is to say its outside wall, the case hardened surface of the wheel body, being regarded as a fixed boundary, the inner wall, i. e. the cylindrical liner though circular may or may not be concentric with it, the limit of variation being governed by the clearness around the bolts in the holes 6 and the grooves 3' in the side plates.

I have already referred to the appendix 8 and explained the function of the plug 9.

Driving power is transmitted to this improved wheel by any of the usual methods.

In the form of the invention shown in Fig. 3 the construction is substantially the same insofar as the axle 1, space 2, interliner 3, side plates 11, etc. are concerned. The appendix 8' shown in Fig. 3 is substantially the same as in the first form of the invention but is of slightly different shape. The wheel is shown as a disk wheel 13 formed with the case hardened insert 5a and with enlarged openings for receiving the driving bolts as in the first form of the invention.

In Fig. 3 there is shown a radial key 14 engageable by an eccentric disc 15 fastened to the wheel body by a pivot having clearance in the disc. When motion is imparted to the side plate by the driving bolt the movement of the side plate causes the key 14 to strike the eccentric disc whereby shock is imparted to the pivot which holds the disc to the wheel body and the reaction thereof causes the balls in the ball chamber to flow under the axle ensuring smooth engagement of the bolts.

I wish it to be understood that I do not limit myself to the precise details of construction in so far as they have been described above, as the same may be varied without departing from my invention. The disposition of the balls may also be varied, that is to say while in the accompanying drawings they appear to be disposed predominantly laterally, my invention may be equally well carried into effect if they are disposed predominantly vertically.

The principle hereinbefore set forth may be applied to mechanical bearings other than on vehicle wheels, for example on shafting or any other mechanical device.

Having now particularly described and ascertained the nature of my said invention and in what manner the same is to be performed, I declare that what I claim is:

1. An improved wheel mechanism comprising a hub formed with an annular vacant chamber around the axis thereof and with means permitting relative radial movement between the side walls and other parts of said hub, an axle, a tubular liner supported entirely by said hub in spaced relation to said axle and forming a wall of said chamber, said tubular liner being mounted for free movement on the interior of the side walls of said hub, within fixed limits and a plurality of superposed balls mounted within said hub in position to bear upon the outer surface of said tubular liner.

2. An improved wheel mechanism comprising a hub formed with an annular chamber around the axis thereof and with means permitting relative radial movement between the side walls and other parts of said hub, an axle, a tubular liner supported by said hub in spaced relation to said axle and forming the inner wall of said chamber, a plurality of superposed balls positioned in said chamber and bearing upon the outer surface of said tubular liner, said mechanism including an additional recess communicating with said chamber and provided with means for removing or inserting balls into the same.

3. An improved wheel mechanism comprising a hub formed with an annular chamber around the axis thereof and with means permitting relative radial movement between the side walls and other parts of said hub, an axle, a tubular liner supported by said hub in spaced relation to said axle and forming the inner wall of said chamber, a plurality of superposed balls positioned in said chamber and bearing upon the outer surface of said tubular liner, said mechanism including an additional recess communicating with said chamber and means for adjusting the combined volume of said recess and chamber.

4. An improved wheel mechanism comprising a hub formed with an annular chamber around the axis thereof and with means permitting relative radial movement between the side walls and other parts of said hub, a plurality of superposed balls in said chamber occupying less than the entire volume thereof, an eccentric loosely pivoted on said wheel and means mounted on a chamber portion of said hub engageable by said eccentric for disturbing the positions of said balls in said chamber.

In witness whereof I affix my signature.

JOHN MUIR.